(12) United States Patent
Honda

(10) Patent No.: US 11,728,516 B2
(45) Date of Patent: Aug. 15, 2023

(54) BATTERY, BATTERY MANUFACTURING METHOD, AND BATTERY MANUFACTURING APPARATUS

(71) Applicant: Panasonic Intellectual Property Management Co., Ltd., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 361 days.

(21) Appl. No.: 16/731,508

(22) Filed: Dec. 31, 2019

(65) Prior Publication Data

US 2020/0136192 A1 Apr. 30, 2020

Related U.S. Application Data

(63) Continuation of application No. 15/478,285, filed on Apr. 4, 2017, now Pat. No. 10,553,907.

(30) Foreign Application Priority Data

Apr. 25, 2016 (JP) ................................. 2016-086779

(51) Int. Cl.
*H01M 10/0585* (2010.01)
*H01M 10/04* (2006.01)

(52) U.S. Cl.
CPC ... *H01M 10/0585* (2013.01); *H01M 10/0404* (2013.01)

(58) Field of Classification Search
CPC .................................................. H01M 10/0585
See application file for complete search history.

(56) References Cited

U.S. PATENT DOCUMENTS

2018/0198169 A1* 7/2018 Fukui ..................... H01M 4/64

FOREIGN PATENT DOCUMENTS

| JP | 2010-282803 | 12/2010 |
| JP | 2011-096550 | 5/2011 |

(Continued)

OTHER PUBLICATIONS

Notice of Allowance issued in U.S. Appl. No. 15/478,285, dated Oct. 17, 2019.

*Primary Examiner* — Ula C Ruddock
*Assistant Examiner* — Thomas H. Parsons
(74) *Attorney, Agent, or Firm* — McDermott Will & Emery LLP

(57) ABSTRACT

A battery including a first electrode layer, a solid electrolyte layer on the first electrode layer, a second electrode layer which is located on the solid electrolyte layer and which is a counter electrode layer of the first electrode layer, and a space portion, wherein a first thickness portion is located on the first active material layer, the second thickness portion is located on the first electrode layer, the second active material layer is located at a position which faces the first thickness portion and which does not face the first active material layer via the second thickness portion, the second collector extends to the position facing the second thickness portion and a region provided with the second active material layer, the second thickness portion is in contact with the second electrode layer, and the space portion is surrounded by the second electrode layer and the second thickness portion.

16 Claims, 17 Drawing Sheets

(56) References Cited

FOREIGN PATENT DOCUMENTS

| | | | |
|---|---|---|---|
| JP | 2011096550 | * | 5/2011 |
| JP | 2013-243004 | | 12/2013 |
| JP | 2015-220012 A | | 12/2015 |
| JP | 2015220012 | * | 12/2015 |

* cited by examiner

BATTERY, BATTERY MANUFACTURING METHOD, AND BATTERY MANUFACTURING APPARATUS

RELATED APPLICATIONS

This application is a continuation of U.S. application Ser. No. 15/478,285, filed Apr. 4, 2017, which in turn claims the benefit of Japanese Application No. 2016-086779, filed Apr. 25, 2016, the disclosures of which are incorporated by reference herein.

BACKGROUND

1. Technical Field

The present disclosure relates to a battery, a battery manufacturing method, and a battery manufacturing apparatus.

2. Description of the Related Art

Japanese Unexamined Patent Application Publication No. 2010-282803 discloses the formation of a solid electrolyte layer having an area larger than the areas of a positive electrode layer and a negative electrode layer. Japanese Unexamined Patent Application Publication No. 2011-096550 discloses a solid-state battery in which the thickness of a solid electrolyte that extends off the perimeter of a positive electrode active material layer and/or the perimeter of a negative electrode active material layer is larger than the thickness of the solid electrolyte interposed between the positive electrode active material layer and the negative electrode active material layer.

SUMMARY

In the related art, it is desired to reduce the risk of a short circuit between a positive electrode layer and a negative electrode layer.

In one general aspect, the techniques disclosed here feature a battery including a first electrode layer, a solid electrolyte layer located on the first electrode layer, a second electrode layer which is located on the solid electrolyte layer and which is a counter electrode layer of the first electrode layer, and a space portion, wherein the first electrode layer is a layer including a first collector and a first active material layer located on the first collector, the second electrode layer is a layer including a second collector and a second active material layer located on the second collector, the solid electrolyte layer is a layer including a first thickness portion having a first thickness and a second thickness portion having a second thickness larger than the first thickness, the first thickness portion is located on the first active material layer, the second thickness portion is located on the first electrode layer, the second active material layer is located at a position which faces the first thickness portion and which does not face the first active material layer via the second thickness portion, the second collector is disposed with extending to a position facing the second thickness portion and a region provided with the second active material layer, the second thickness portion is in contact with the second electrode layer, and the space portion is surrounded by the second electrode layer and the second thickness portion.

According to the present disclosure, the risk of a short circuit between a positive electrode layer and a negative electrode layer can be reduced. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The embodiments according to the present disclosure will be described below with reference to the drawings.

First embodiment

Figure 1:
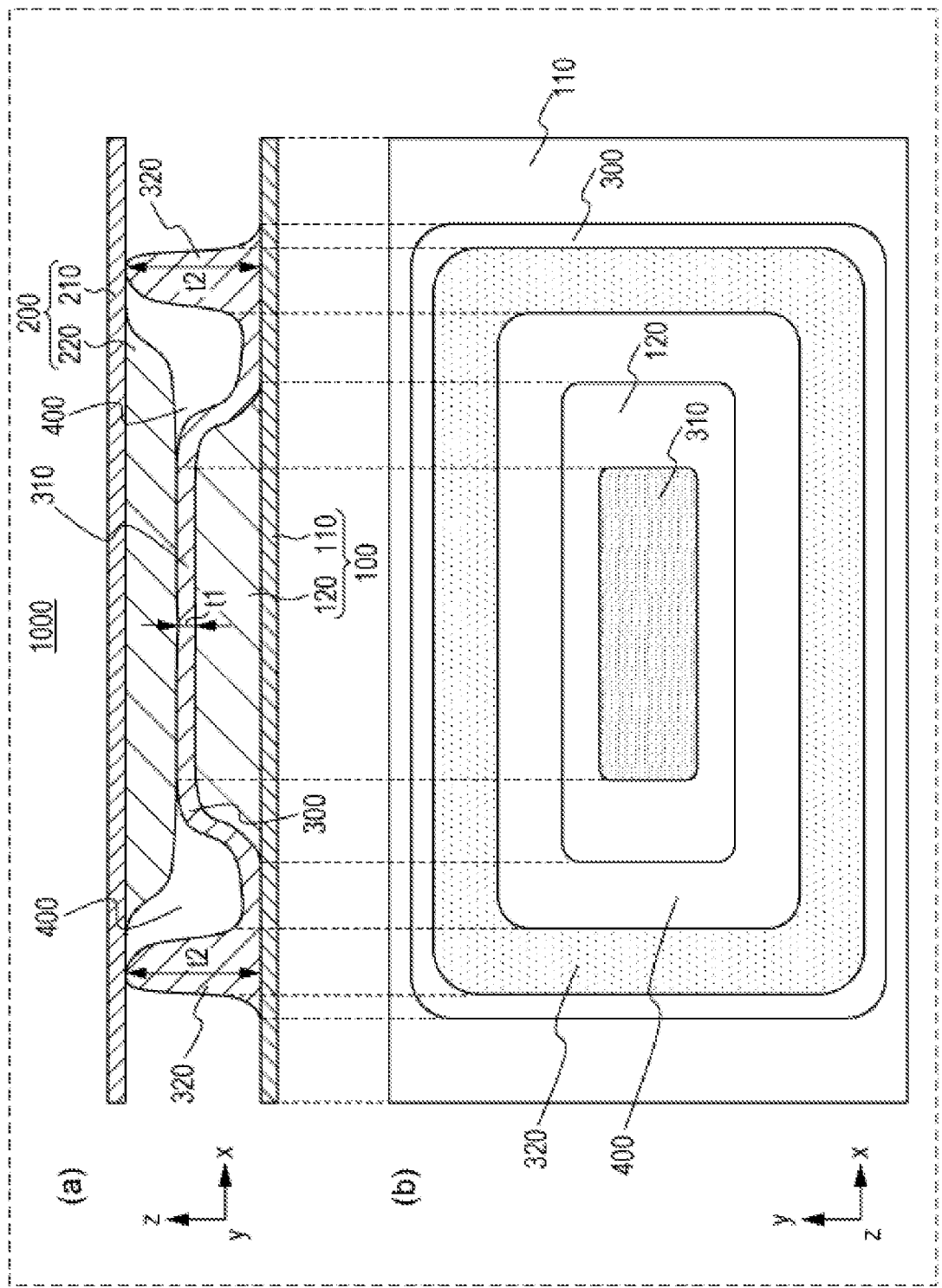
FIG. 1 is a diagram schematically showing the configuration of a battery according to a first embodiment.

FIG. 1 is a diagram schematically showing the configuration of a battery 1000 according to a first embodiment.

FIG. 1(a) is an x-z diagram (sectional view) of a first electrode layer 100, a solid electrolyte layer 300, and a second electrode layer 200.

FIG. 1(b) is an x-y diagram (perspective top view) of the first electrode layer 100 and the solid electrolyte layer 300.

The battery 1000 according to the first embodiment includes the first electrode layer 100, the second electrode layer 200, the solid electrolyte layer 300, and a space portion 400.

The first electrode layer 100 is a layer including a first collector 110 and a first active material layer 120.

The first active material layer 120 is located on the first collector 110. The first active material layer 120 contains a first active material.

The second electrode layer 200 is a counter electrode layer of the first electrode layer 100. The second electrode layer 200 is located on the solid electrolyte layer 300. The second electrode layer 200 is a layer including a second collector 210 and a second active material layer 220.

The second active material layer 220 is located on the second collector 210. The second active material layer 220 contains a second active material.

The first electrode layer 100 may be a positive electrode layer. At this time, the first collector 110 is a positive electrode collector. The first active material layer 120 is a positive electrode active material layer. The first active material is a positive electrode active material. The second electrode layer 200 is a negative electrode layer. The second collector 210 is a negative electrode collector. The second active material layer 220 is a negative electrode active material layer. The second active material is a negative electrode active material.

Alternatively, the first electrode layer 100 may be a negative electrode layer. At this time, the first collector 110 is a negative electrode collector. The first active material layer 120 is a negative electrode active material layer. The first active material is a negative electrode active material. The second electrode layer 200 is a positive electrode layer. The second collector 210 is a positive electrode collector. The second active material layer 220 is a positive electrode active material layer. The second active material is a positive electrode active material.

The solid electrolyte layer 300 is located on the first electrode layer 100 (that is, on at least one of the first active material layer 120 and the first collector 110). The solid electrolyte layer 300 contains a solid electrolyte. The solid electrolyte layer 300 is a layer including a first thickness portion 310 and a second thickness portion 320.

The first thickness portion 310 has a first thickness t1. The first thickness portion 310 is located on the first active material layer 120.

The second thickness portion 320 has a second thickness t2. The second thickness t2 is larger than the first thickness t1. The second thickness portion 320 is located on the first electrode layer 100 (that is, on at least one of the first active material layer 120 and the first collector 110). In the battery 1000 shown in FIG. 1, the second thickness portion 320 is located on the first collector 110.

The second active material layer 220 is located on the second collector 210. The second active material layer 220 contains the second active material. The second active material layer 220 is located at a position which faces the first thickness portion 310 (for example, position in contact with the first thickness portion 310) and which does not face the first active material layer 120 via the second thickness portion 320.

The second collector 210 is disposed so as to extend (e.g., with extending) to the position facing the second thickness portion 320 and a region provided with the second active material layer 220. At this time, the second collector 210 may be located parallel to the first collector 110.

The second thickness portion 320 is in contact with the second electrode layer 200. For example, the second collector 210 may be in contact with the second thickness portion 320.

The space portion 400 is surrounded by the second thickness portion 320 and the second electrode layer 200. For example, the space portion 400 may be surrounded by the second thickness portion 320 and at least one of the second active material layer 220 and the second collector 210.

According to the above-described configuration, the likelihood of contact between the positive electrode collector and the negative electrode collector (that is, the first collector 110 and the second collector 210) can be reduced. That is, the distance between the positive electrode collector and the negative electrode collector can be maintained at a certain distance or more (for example, the second thickness or more) by the second thickness portion 320 of the solid electrolyte layer 300. Therefore, the positive electrode collector and the negative electrode collector can be prevented from getting close to each other. Consequently, for example, even in the case of an all-solid-state battery not including a separator between a positive electrode layer and a negative electrode layer, the risk of a short circuit between the positive electrode layer and the negative electrode layer due to direct contact between the positive electrode collector and the negative electrode collector can be reduced. In addition, a specific member (for example, an insulation spacer) for insulating the positive electrode layer from the negative electrode layer becomes unnecessary. Consequently, the battery production steps can be further simplified and the cost can be reduced.

According to the above-described configuration, deformation and stress can be relaxed by the space portion 400. That is, the stress caused by expansion and shrinkage of each of the layers (the first active material layer 120, the second active material layer 220, and the solid electrolyte layer 300) during use of the battery can be relaxed by the space portion 400. For example, in the case where the second active material layer 220 expands, part of the second active material layer 220 is allowed to expand into the adjoining space portion 400. For example, in the case where the battery undergoes bending deformation, the generated stress can be relaxed by the space portion 400. Also, the stress generated during production of the battery can be relaxed by the space portion 400.

The above-described effects will be described in detail with reference to comparative examples 1 to 3 below.

Figure 14:
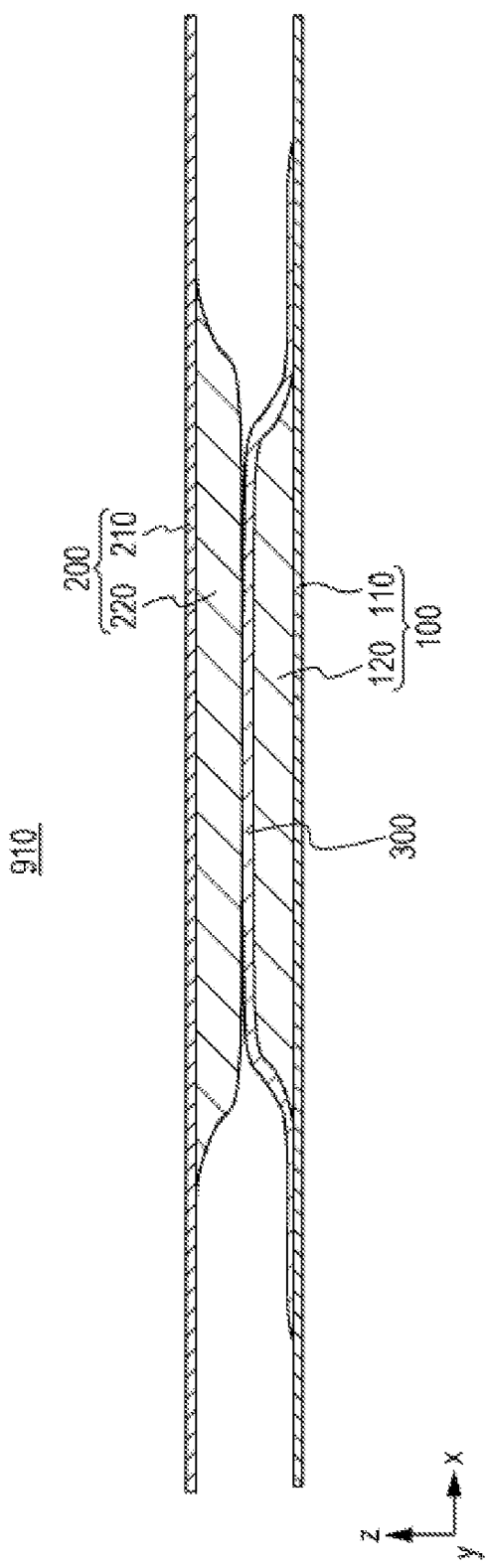
FIG. 14 is a sectional view schematically showing the configuration of a battery according to comparative example 1.

FIG. 14 is a sectional view schematically showing the configuration of a battery 910 according to comparative example 1.

In the battery 910 according to comparative example 1, a solid electrolyte layer 300 is not formed up to the end portion of each of the collectors. That is, each of the collectors is partly exposed.

In the battery 910 according to comparative example 1, the solid electrolyte layer 300 does not include a second thickness portion 320.

Consequently, the distance between a first collector 110 and a second collector 210 becomes unstable at an end portion of each of the collectors. Therefore, the first collector 110 and the second collector 210 easily get close to each other. As a result, there is the risk of direct contact between exposed collectors.

As described above, in comparative example 1, there is the risk of an occurrence of a short circuit resulting from poor positional accuracy between a positive electrode layer and a negative electrode layer.

On the other hand, according to the first embodiment, as described above, the likelihood of contact between the positive electrode collector and the negative electrode collector can be reduced by providing the solid electrolyte layer 300 with the second thickness portion 320.

Figure 15:
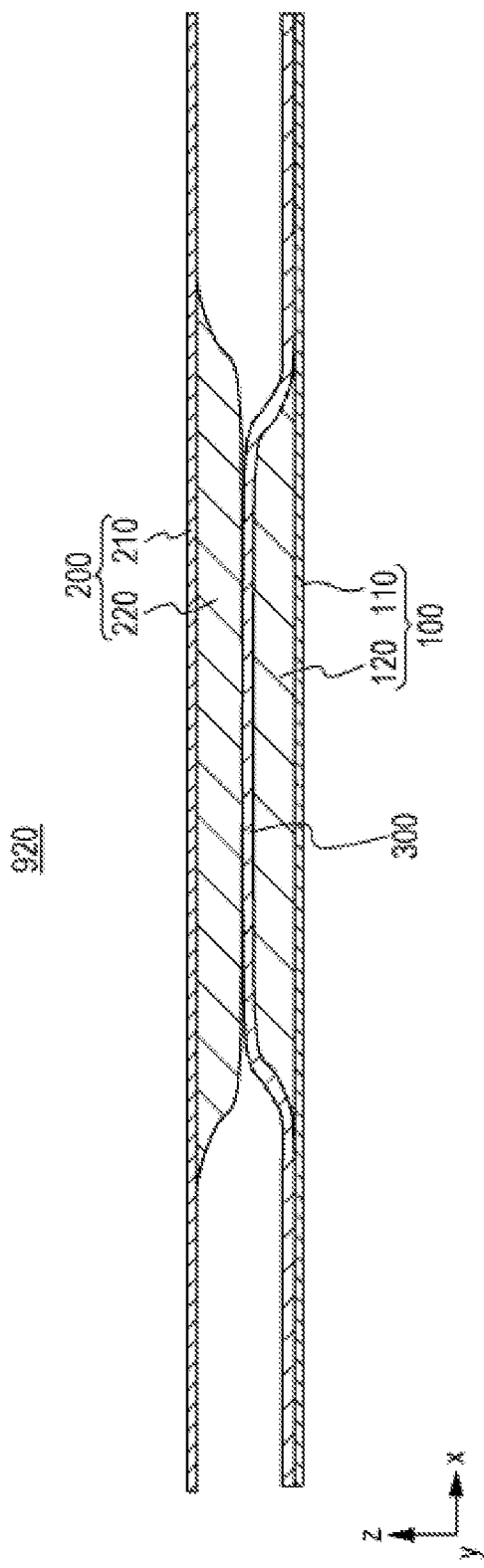
FIG. 15 is a sectional view schematically showing the configuration of a battery according to comparative example 2.

FIG. 15 is a sectional view schematically showing the configuration of a battery 920 according to comparative example 2.

In the battery 920 according to comparative example 2, a solid electrolyte layer 300 is cut at the end portion of each of collectors. For example, in the configuration, the end portion of each of the collectors is cut and removed together with the solid electrolyte layer 300 such that the exposed portion of each of the collectors in the battery 920 is removed.

In the case where the solid electrolyte layer on the collector is cut, as described above, fine defects due to cracking or falling are easily generated in the solid electrolyte in the vicinity of the cut portion. Consequently, the function, as an insulator, of the solid electrolyte at the battery end portion may be impaired.

In the battery 920 according to comparative example 2, the solid electrolyte layer 300 does not include a second thickness portion 320.

Consequently, the distance between a first collector 110 and a second collector 210 becomes unstable at an end portion of each of the collectors. Therefore, the first collector 110 and the second collector 210 easily get close to each other. As a result, there is the risk of direct contact between exposed collectors.

As described above, in comparative example 2, there is the risk of an occurrence of a short circuit resulting from poor insulation between a positive electrode layer and a negative electrode layer.

On the other hand, according to the first embodiment, as described above, the likelihood of contact between the positive electrode collector and the negative electrode collector can be reduced by providing the solid electrolyte layer 300 with the second thickness portion 320.

Figure 16:
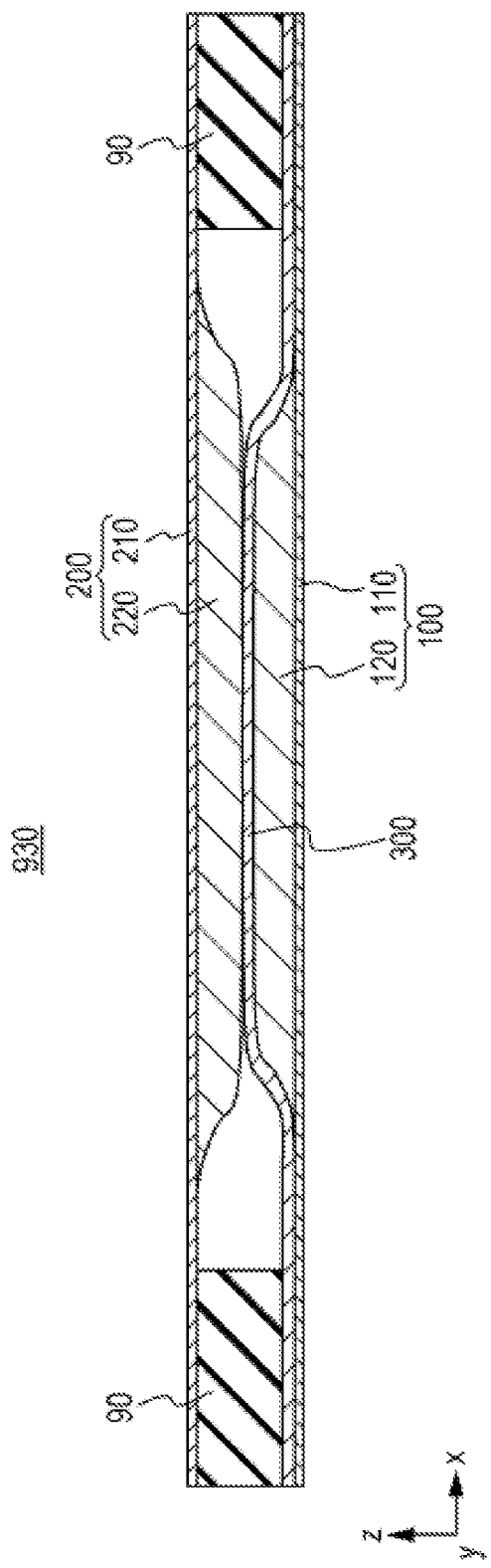
FIG. 16 is a sectional view schematically showing the configuration of a battery according to comparative example 3.

FIG. 16 is a sectional view schematically showing the configuration of a battery 930 according to comparative example 3.

The battery 930 in comparative example 3 has a configuration in which an insulation spacer 90 is further provided in addition to the configuration of the battery 920 according to comparative example 2. That is, the insulation spacer 90 is disposed between the first collector 110 and the second collector 210.

A short circuit due to contact between the first collector 110 and the second collector 210 can be prevented by disposing the insulation spacer 90. However, in a method for manufacturing the battery 930 according to comparative example 3, a step of preparing the insulation spacer 90 is further required. In addition, a step of positioning the insulation spacer 90 between the first collector 110 and the second collector 210 with a high degree of accuracy and a step of fixing the insulation spacer 90 are required.

As described above, in comparative example 3, the battery production steps are complicated and the cost increases.

On the other hand, according to the first embodiment, complicated steps required in the case where the insulation spacer 90 is used can be omitted by performing a step of forming the second thickness portion 320 in the solid electrolyte layer 300. The step of forming the second thickness portion 320 in the solid electrolyte layer 300 can be easily added as one step in the steps of forming the solid electrolyte layer 300. That is, the battery production steps can be further simplified and the cost can be reduced.

Figure 17:
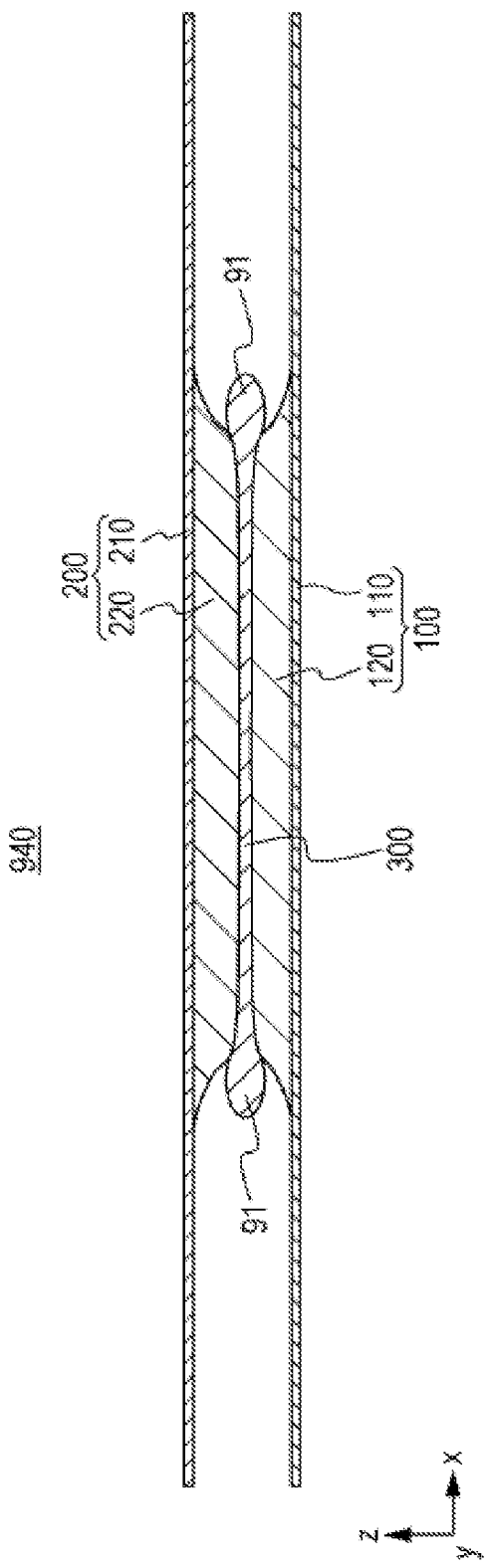
FIG. 17 is a sectional view schematically showing the configuration of a battery according to comparative example 4.

FIG. 17 is a sectional view schematically showing the configuration of a battery 940 according to comparative example 4.

In the battery 940 according to comparative example 4, a solid electrolyte layer 300 has an extruded portion 91. The thickness of the extruded portion 91 is smaller than the distance between a first electrode layer 100 and a second collector 210. That is, the extruded portion 91 is not in contact with the second collector 210. The extruded portion 91 does not have a large contact area with the first electrode layer 100. Consequently, in the case where an external force is applied, the extruded portion 91 may make a positional deviation (for example, separation from the first electrode layer 100).

Consequently, the distance between a first collector 110 and the second collector 210 becomes unstable at an end portion of the collector. Therefore, the first collector 110 and the second collector 210 easily get close to each other. As a result, there is the risk of direct contact between exposed collectors.

As described above, in comparative example 4, there is the risk of an occurrence of a short circuit resulting from poor insulation between a positive electrode layer and a negative electrode layer.

On the other hand, according to the first embodiment, as described above, the likelihood of contact between the positive electrode collector and the negative electrode collector can be reduced by providing the solid electrolyte layer 300 with the second thickness portion 320.

In this regard, in the first embodiment, the contact area between the second thickness portion 320 (or the third thickness portion 330) and the first electrode layer 100 (that is, at least one of the first active material layer 120 and the first collector 110) may be larger than the contact area between the second thickness portion 320 and the second collector 210. At this time, the contact portion between the second thickness portion 320 (or the third thickness portion 330) and the first electrode layer 100 (that is, at least one of the first active material layer 120 and the first collector 110) may be connected to (for example, integrally formed with) the first thickness portion 310.

According to the above-described configuration, the strength of the second thickness portion 320 (or the third thickness portion 330) can be enhanced. That is, even in the case where an external force is applied such that the first electrode layer 100 and the second collector 210 get close to each other, positional deviation (for example, separation from the first electrode layer 100) of the second thickness portion 320 (or the third thickness portion 330) can be suppressed. Consequently, the likelihood of contact between the positive electrode collector and the negative electrode collector can be further reduced.

As shown in FIG. 1, the space portion 400 may be surrounded by the second thickness portion 320, the second active material layer 220, the second collector 210, and the solid electrolyte layer 300.

The second active material layer 220 may be formed in a wider range and the second active material layer 220 may be in contact with the second thickness portion 320. In this case, the space portion 400 is surrounded by the second thickness portion 320, the second active material layer 220, and the solid electrolyte layer 300.

As shown in FIG. 1, the entire second collector 210 may be located parallel to the first collector 110. That is, the distance between the first collector 110 and the second collector 210 may be constant in the entire film formation region.

Alternatively, part of the second collector 210 may be located parallel to the first collector 110. That is, for example, the distance between the first collector 110 and the second collector 210 in the range in which the first thickness portion 310 is disposed may be equal to the distance between the first collector 110 and the second collector 210 in the range in which the second thickness portion 320 is disposed.

As shown in FIG. 1, the first active material layer 120 may be formed in a range smaller than the first collector 110.

As shown in FIG. 1, the second active material layer 220 may be formed in a range smaller than the second collector 210.

As shown in FIG. 1, the solid electrolyte layer 300 may be formed so as to have an area larger than the areas of the first active material layer 120 and the second active material layer 220. Consequently, a short circuit due to direct contact between the positive electrode layer and the negative electrode layer can be prevented.

As shown in FIG. 1, the formation range of the second active material layer 220 may be larger than the formation range of the first active material layer 120. At this time, the first active material layer 120 may be a positive electrode active material layer and the second active material layer 220 may be a negative electrode active material layer. That is, the formation range of the negative electrode active material layer may be larger than the formation range of the positive electrode active material layer. Consequently, for example, a malfunction (for example, reduction in reliability) of the battery due to lithium deposition may be prevented.

Alternatively, the formation ranges of the first active material layer 120 and the second active material layer 220 may be equal.

As shown in FIG. 1, the solid electrolyte layer 300 may be formed in a range smaller than the first collector 110 or the second collector 210. Consequently, for example, in the case where the collector is cut into a predetermined shape, an occurrence of cracking of the solid electrolyte layer 300 and falling of part thereof can be reduced. Also, generation of scraps and chips during cutting can be reduced.

Alternatively, the formation range of the solid electrolyte layer 300 may be the same range as the entire range of the first collector 110 or the second collector 210. In the case where cutting is performed after the solid electrolyte layer 300 is formed in the entire range of the collector, fine cracks may be generated in the solid electrolyte layer 300. However, the second thickness portion 320 (that is, a portion having a very large thickness compared with the first thickness portion 310) is disposed in the cutting region. Consequently, a short circuit between the positive electrode and the negative electrode does not easily occur.

Regarding the positive electrode collector, metal foil (for example, SUS foil or Al foil) or the like may be used. The thickness of the positive electrode collector may be, for example, 5 to 50 μm.

Examples of the positive electrode active material contained in the positive electrode active material layer may include known positive electrode active materials (for example, lithium cobaltate and LiNO). Examples of the material for forming the positive electrode active material may include various materials that can release and occlude Li.

Examples of the material contained in the positive electrode active material layer may include known solid electrolytes (for example, inorganic solid electrolytes). Examples of the inorganic solid electrolyte may include sulfide solid electrolytes and oxide solid electrolytes. Examples of the sulfide solid electrolyte may include a mixture of $Li_2S$ and $P_2S_5$. The surface of the positive electrode active material may be coated with the solid electrolyte. Examples of the material contained in the positive electrode active material layer may include electrically conductive materials (for example, acetylene black) and binders (for example, polyvinylidene fluoride).

Regarding the negative electrode collector, metal foil (for example, SUS foil or Cu foil) or the like may be used. The thickness of the negative electrode collector may be, for example, 5 to 50 μm.

Examples of the negative electrode active material contained in the negative electrode active material layer may include known negative electrode active materials (for example, graphite). Examples of the material for the negative electrode active material may include various materials that can release and occlude Li.

Examples of the material contained in the negative electrode active material layer may include known solid electrolytes (for example, inorganic solid electrolytes). Examples of the inorganic solid electrolyte may include sulfide solid electrolytes and oxide solid electrolytes. Examples of the sulfide solid electrolyte may include a mixture of $Li_2S$ and $P_2S_5$. Examples of the material contained in the negative electrode active material layer may include electrically conductive materials (for example, acetylene black) and binders (for example, polyvinylidene fluoride).

Examples of the solid electrolyte contained in the solid electrolyte layer 300 may include known solid electrolytes (for example, inorganic solid electrolytes). Examples of the inorganic solid electrolyte may include sulfide solid electrolytes and oxide solid electrolytes. Examples of the sulfide solid electrolyte may include a mixture of $Li_2S$ and $P_2S_5$.

Examples of the material contained in the solid electrolyte layer 300 may include binders (for example, polyvinylidene fluoride).

As shown in FIG. 1, in the battery 1000 according to the first embodiment, the second thickness portion 320 may be located between the first thickness portion 310 and a first end of the first collector 110 and between the first thickness portion 310 and a second end of the first collector 110.

According to the above-described configuration, the likelihood of contact between the second collector 210 and both the first end of the first collector 110 and the second end of the first collector 110 can be further reduced.

The first end and the second end of the first collector 110 may be both end portions (outer edges) in the x-direction shown in FIG. 1.

Alternatively, the first end and the second end of the first collector 110 may be both end portions (outer edges) in the y-direction shown in FIG. 1.

As shown in FIG. 1, in the battery 1000 according to the first embodiment, the second thickness portion 320 may be located between the first thickness portion 310 and the four ends of the first collector 110.

According to the above-described configuration, the likelihood of contact between the four ends of the first collector 110 and the second collector 210 can be further reduced.

As shown in FIG. 1, the second thickness portion 320 may be located, as one continuous portion, between the first thickness portion 310 and the four ends of the first collector 110.

Alternatively, the second thickness portion 320 may be located, as a plurality of portions separated from each other (that is, a plurality of mutually discontinuous portions), between the first thickness portion 310 and the four ends of the first collector 110.

As shown in FIG. 1, in the battery 1000 according to the first embodiment, the space portion 400 may be disposed so as to surround (e.g., with surrounding) the second active material layer 220.

According to the above-described configuration, the space portion 400 can further relax deformation and stress. That is, for example, in the case where the second active material layer 220 expands, the second active material layer 220 is allowed to expand into the space portion 400 surrounding the second active material layer 220.

Figure 2:
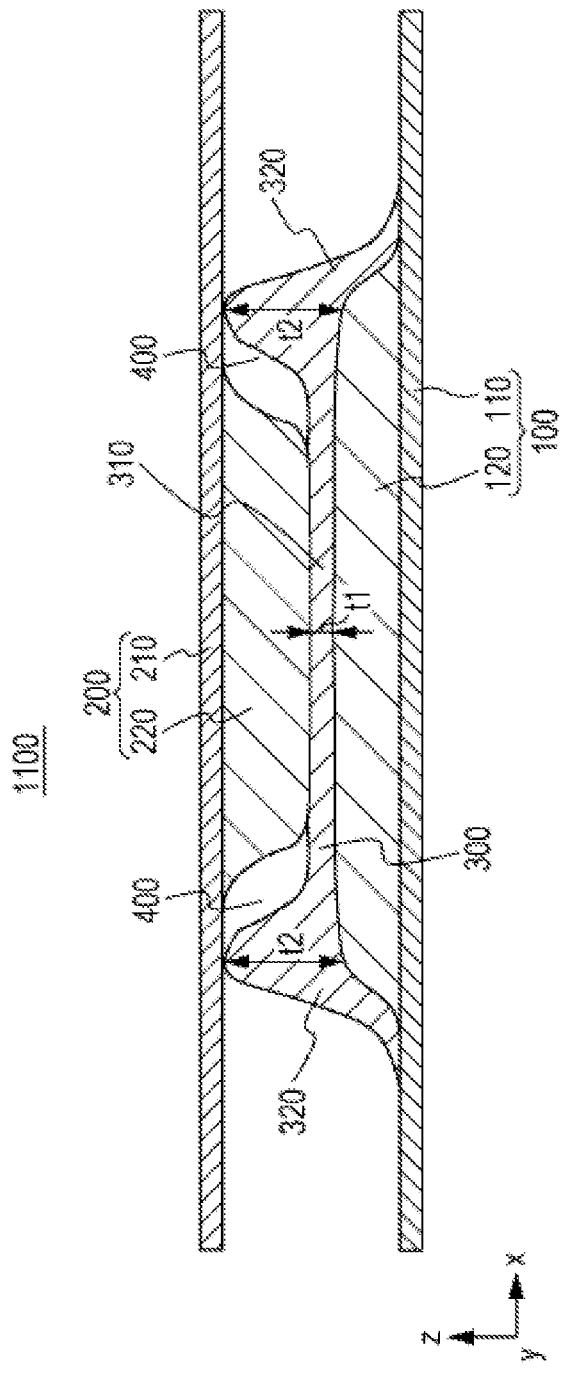
FIG. 2 is a sectional view schematically showing the configuration of a battery according to the first embodiment.

FIG. 2 is a sectional view schematically showing the configuration of a battery 1100 according to the first embodiment.

In the battery 1100 shown in FIG. 2, the second thickness portion 320 is located on the first active material layer 120.

According to the above-described configuration, the first active material layer 120 can be formed in a wider range. Therefore, a battery containing a larger amount of first active material can be formed.

In the first embodiment, the solid electrolyte layer 300 may include the third thickness portion 330.

The third thickness portion 330 has a third thickness t3. The third thickness t3 is larger than the first thickness t1 and smaller than the second thickness t2.

The third thickness portion 330 is located at a position facing the second active material layer 220 or on the first active material layer 120.

According to the above-described configuration, the distance between the first collector 110 and the second collector 210 can be more firmly fixed by the second thickness portion 320 and the third thickness portion 330. Consequently, the likelihood of contact between the first collector 110 and the second collector 210 can be further reduced.

Figure 3:
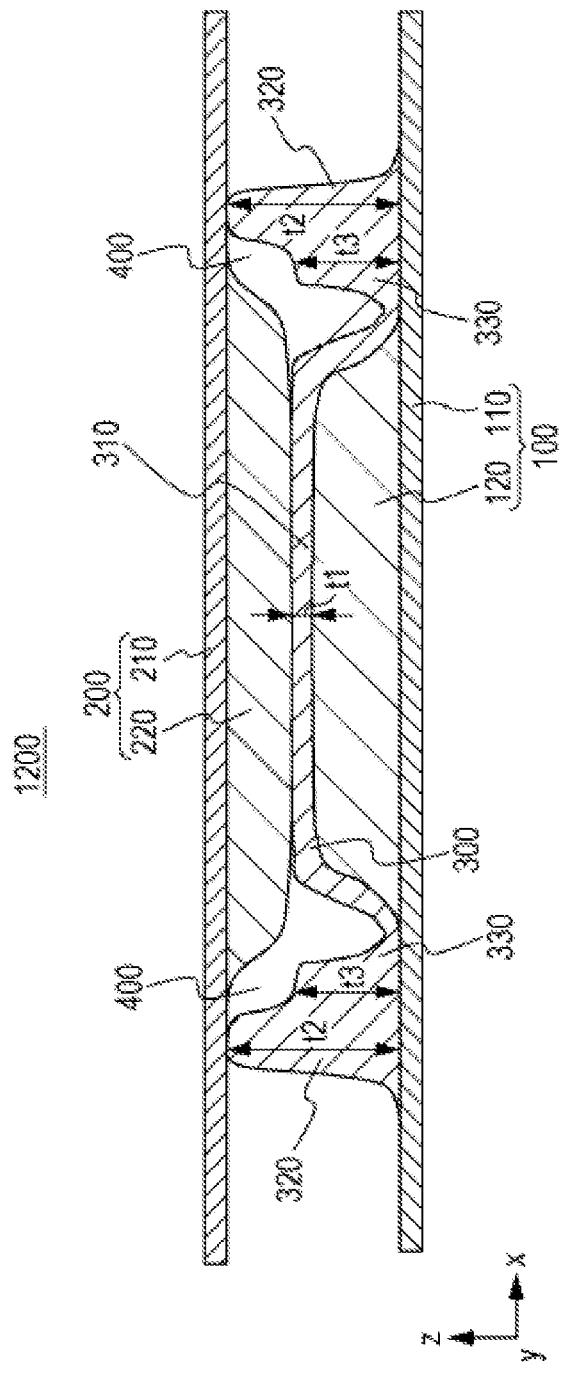
FIG. 3 is a sectional view schematically showing the configuration of a battery according to the first embodiment.

FIG. 3 is a sectional view schematically showing the configuration of a battery 1200 according to the first embodiment.

In the battery 1200 shown in FIG. 3, the third thickness portion 330 is located at a position facing the second active material layer 220.

According to the above-described configuration, as shown in FIG. 3, even in the case where only the second thickness portion 320 can be brought into contact with the second collector 210, the third thickness portion 330 located close to the second thickness portion 320 can structurally support the second thickness portion 320. Therefore, the distance between the first collector 110 and the second collector 210 can be more firmly fixed by the second thickness portion 320 and the third thickness portion 330. Consequently, the likelihood of contact between the first collector 110 and the second collector 210 can be further reduced.

In the battery 1200 shown in FIG. 3, the space portion 400 is surrounded by the second thickness portion 320, the second active material layer 220, the second collector 210, the solid electrolyte layer 300, and the third thickness portion 330.

Figure 4:
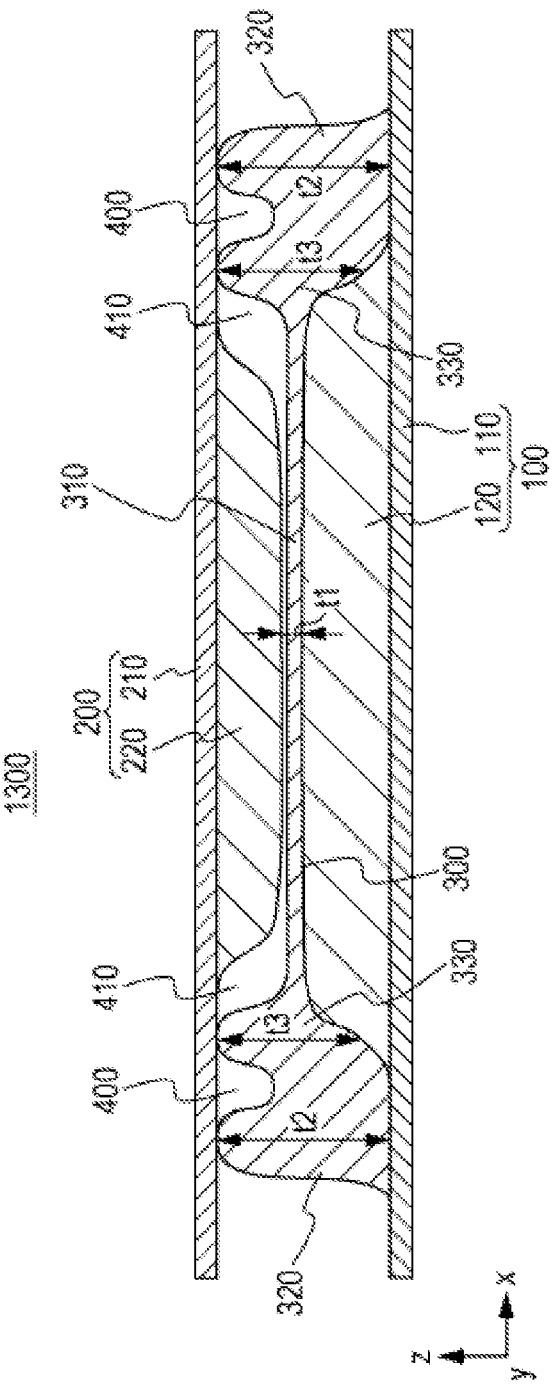
FIG. 4 is a sectional view schematically showing the configuration of a battery according to the first embodiment.

FIG. 4 is a sectional view schematically showing the configuration of a battery 1300 according to the first embodiment.

In the battery 1300 shown in FIG. 4, the third thickness portion 330 is located on the first active material layer 120.

According to the above-described configuration, as shown in FIG. 4, the second collector 210 can be supported by both the second thickness portion 320 and the third thickness portion 330. Therefore, the distance between the first collector 110 and the second collector 210 can be more firmly fixed by the second thickness portion 320 and the third thickness portion 330. Consequently, the likelihood of contact between the first collector 110 and the second collector 210 can be further reduced.

In the battery 1300 shown in FIG. 4, the space portion 400 is surrounded by the second thickness portion 320, the second collector 210, and the solid electrolyte layer 300.

In the battery 1300 shown in FIG. 4, the third thickness portion 330 may be in contact with the second collector 210.

The battery 1300 shown in FIG. 4 includes a second space portion 410. The second space portion 410 is surrounded by the third thickness portion 330, the second active material layer 220, the second collector 210, and the solid electrolyte layer 300. The second space portion 410 can exert the same effects as the effects of the space portion 400.

As described above, the battery according to the first embodiment is characterized in that the solid electrolyte layer 300 is formed so as not to have a uniform thickness but to have a plurality of thicknesses.

In the first embodiment, the first thickness t1 may refer to a maximum thickness of the first thickness portion 310.

In the first embodiment, the second thickness t2 may refer to a maximum thickness of the second thickness portion 320.

In the first embodiment, the third thickness t3 may refer to a maximum thickness of the third thickness portion 330.

Figure 18:
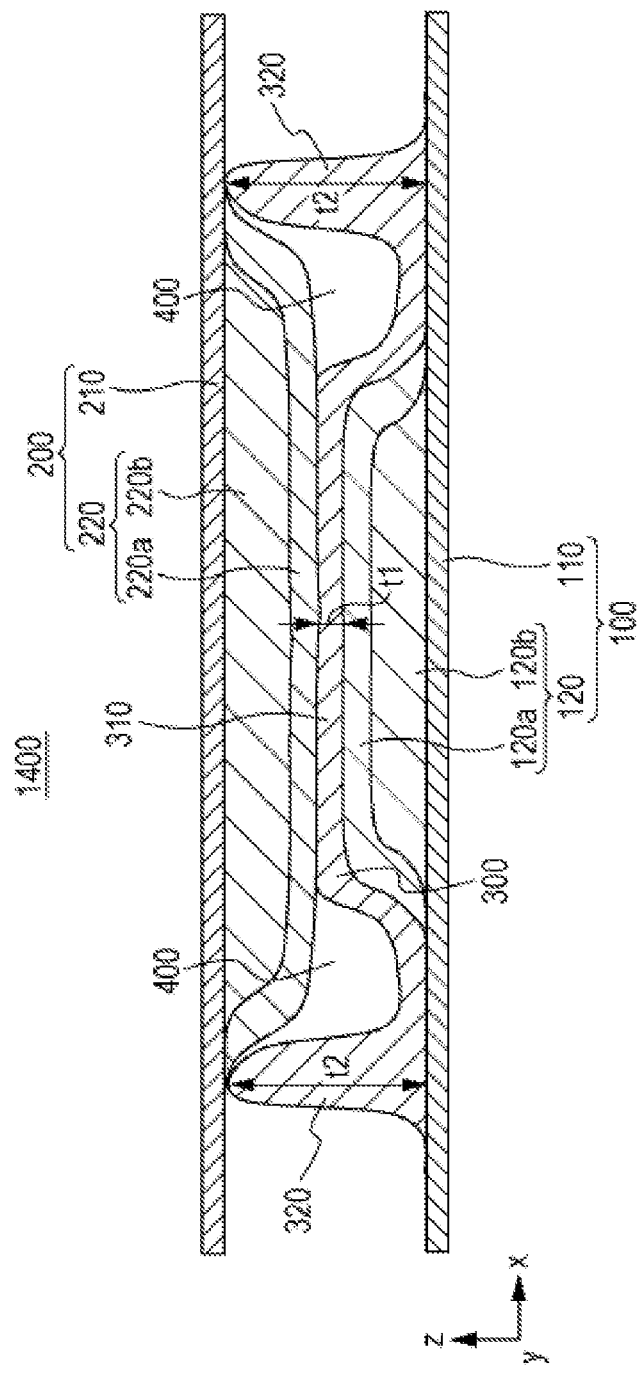
FIG. 18 is a sectional view schematically showing the configuration of a battery according to the first embodiment.

FIG. 18 is a sectional view schematically showing the configuration of a battery 1400 according to the first embodiment.

The battery 1400 according to the first embodiment has a configuration described below in addition to the configuration of the battery 1000 according to the first embodiment.

That is, in the battery 1400 according to the first embodiment, the first active material layer 120 includes a first layer 120a and a second layer 120b.

The first layer 120a of the first active material layer 120 is a layer in contact with the solid electrolyte layer 300. The first layer 120a of the first active material layer 120 is, for example, a layer containing the solid electrolyte at a concentration higher than the concentration in the second layer 120b of the first active material layer 120.

The second layer 120b of the first active material layer 120 is a layer in contact with the first collector 110. The second layer 120b of the first active material layer 120 is, for example, a layer containing the first active material at a concentration higher than the concentration in the first layer 120a of the first active material layer 120.

In the battery 1400 according to the first embodiment, the second active material layer 220 includes a first layer 220a and a second layer 220b.

The first layer 220a of the second active material layer 220 is a layer in contact with the solid electrolyte layer 300. The first layer 220a of the second active material layer 220 is, for example, a layer containing the solid electrolyte at a concentration higher than the concentration in the second layer 220b of the second active material layer 220.

The second layer 220b of the second active material layer 220 is a layer in contact with the second collector 210. The second layer 220b of the second active material layer 220 is, for example, a layer containing the second active material at a concentration higher than the concentration in the first layer 220a of the second active material layer 220.

Figure 19:
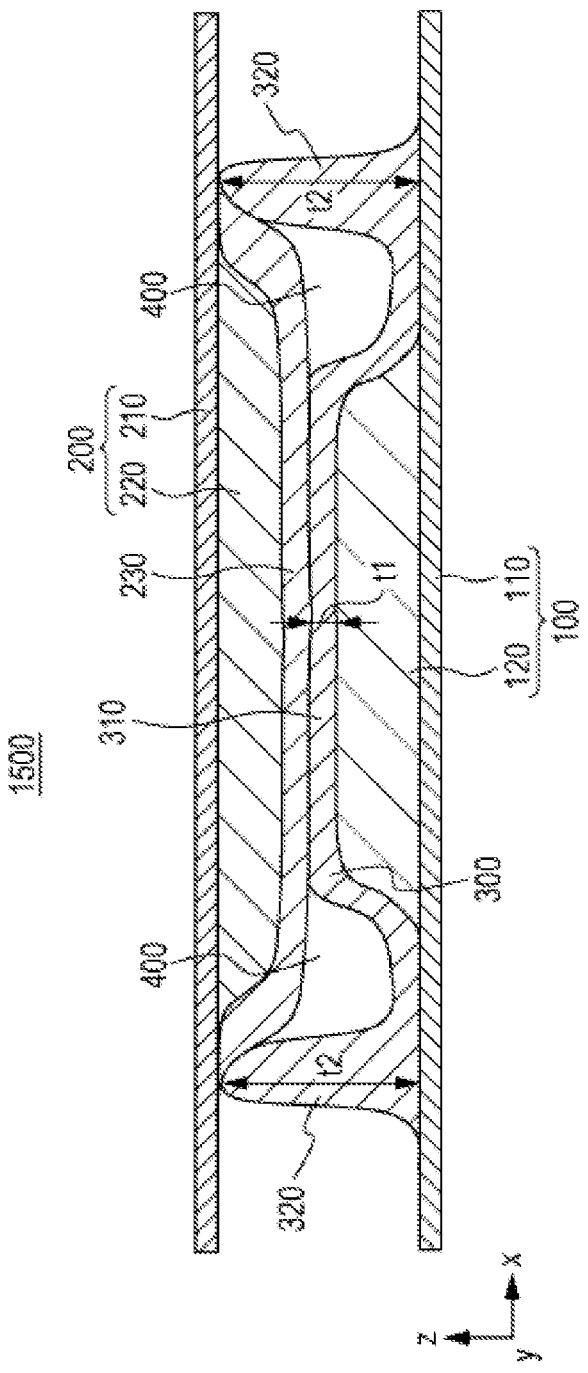
FIG. 19 is a sectional view schematically showing the configuration of a battery according to the first embodiment.

FIG. 19 is a sectional view schematically showing the configuration of a battery 1500 according to the first embodiment.

The battery 1500 according to the first embodiment has a configuration described below in addition to the configuration of the battery 1000 according to the first embodiment.

That is, in the battery 1500 according to the first embodiment, the second electrode layer 200 further includes a second solid electrolyte layer 230.

The second solid electrolyte layer 230 is located between the second active material layer 220 and the first thickness portion 310. The second solid electrolyte layer 230 is a layer containing the solid electrolyte.

The second thickness portion 320 is in contact with the second solid electrolyte layer 230. At this time, the second thickness portion 320 may be in contact with only the second solid electrolyte layer 230. Alternatively, the second thickness portion 320 may be in contact with both the second solid electrolyte layer 230 and the second collector 210.

The space portion 400 is surrounded by the second solid electrolyte layer 230 and the second thickness portion 320.

According to the above-described configuration, deformation and stress can be relaxed by the space portion 400. That is, the stress caused by expansion and shrinkage of each of the layers (the first active material layer 120, the second active material layer 220, the solid electrolyte layer 300, and the second solid electrolyte layer 230) during use of the battery can be relaxed by the space portion 400. For example, in the case where the second active material layer 220 and the second solid electrolyte layer 230 expand, part of the second solid electrolyte layer 230 is allowed to expand into the adjoining space portion 400.

In the battery 1500 according to the first embodiment, the second thickness portion 320 may be in contact with the second collector 210 and the second solid electrolyte layer 230.

In the battery 1500 according to the first embodiment, the space portion 400 may be disposed so as to surround (e.g., with surrounding) the second solid electrolyte layer 230.

According to the above-described configuration, the space portion 400 can further relax deformation and stress. That is, for example, in the case where the second active material layer 220 and the second solid electrolyte layer 230 expand, the second solid electrolyte layer 230 is allowed to expand into the space portion 400 surrounding them.

The material contained in the second solid electrolyte layer 230 and the material contained in the solid electrolyte layer 300 may be the same or different from each other.

The battery manufacturing method according to the first embodiment will be described as a second embodiment below.

Second embodiment

The second embodiment will be described below. The same explanations as those in the above-described first embodiment are appropriately omitted.

Figure 5:
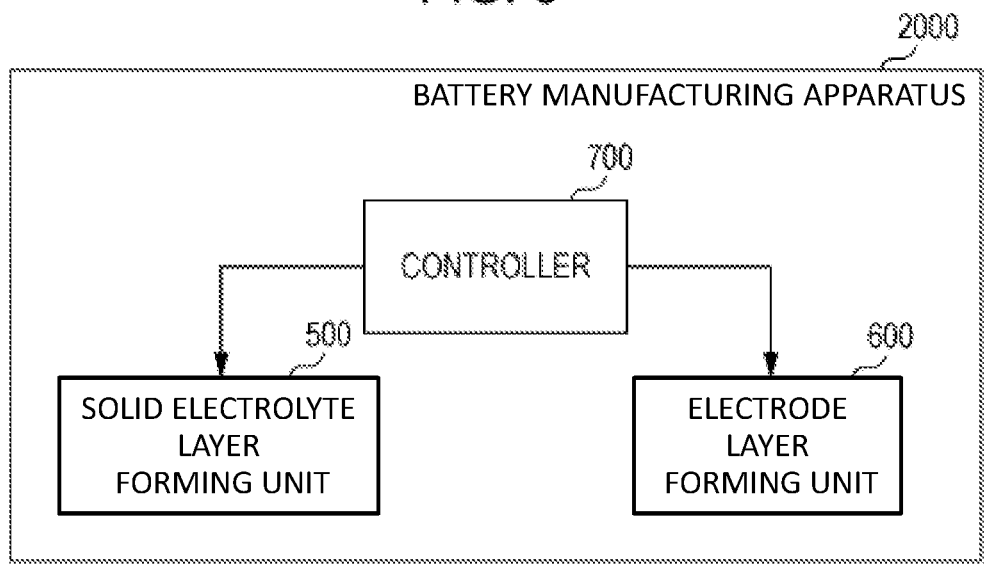
FIG. 5 is a diagram schematically showing the configuration of a battery manufacturing apparatus according to a second embodiment.

FIG. 5 is a diagram schematically showing the configuration of a battery manufacturing apparatus 2000 according to the second embodiment.

The battery manufacturing apparatus 2000 according to the second embodiment includes a solid electrolyte layer forming unit 500 and an electrode layer forming unit 600.

The solid electrolyte layer forming unit 500 forms the solid electrolyte layer 300 on the first electrode layer 100.

More specifically, the solid electrolyte layer forming unit 500 forms the first thickness portion 310 on the first active material layer 120.

The solid electrolyte layer forming unit 500 forms the second thickness portion 320 on the first electrode layer 100 (that is, on at least one of the first active material layer 120 and the first collector 110).

The electrode layer forming unit 600 forms the second electrode layer 200 at a position facing the solid electrolyte layer 300.

More specifically, the electrode layer forming unit 600 forms the second active material layer 220 after the second thickness portion 320 is formed by the solid electrolyte layer forming unit 500. The electrode layer forming unit 600 forms the second active material layer 220 at a position facing (for example, in contact with) the first thickness portion 310 and not facing the first active material layer 120 via the second thickness portion 320.

The electrode layer forming unit 600 forms the second collector 210 that extends to the position facing the second thickness portion 320 and a region provided with the second active material layer 220.

Figure 6:
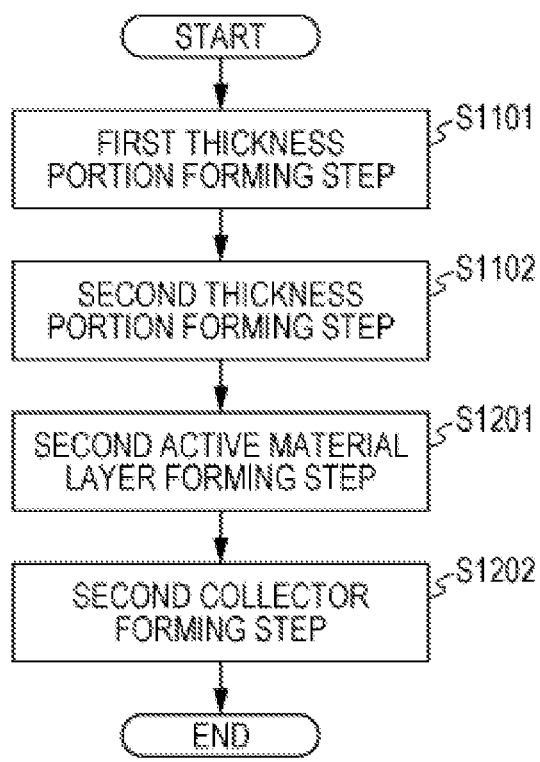
FIG. 6 is a flow chart showing a battery manufacturing method according to the second embodiment.

FIG. 6 is a flow chart showing the battery manufacturing method according to the second embodiment.

The battery manufacturing method according to the second embodiment is a battery manufacturing method that involves using the battery manufacturing apparatus 2000 according to the second embodiment. For example, the battery manufacturing method according to the second embodiment is a battery manufacturing method performed by the battery manufacturing apparatus 2000 according to the second embodiment.

The battery manufacturing method according to the second embodiment includes a first thickness portion forming step S1101 (=forming step (a1)), a second thickness portion forming step S1102 (=forming step (a2)), a second active material layer forming step S1201 (=forming step (b)), and a second collector forming step S1202 (=forming step (c)).

The first thickness portion forming step S1101 is a step of forming the first thickness portion 310 on the first active material layer 120 by the solid electrolyte layer forming unit 500.

The second thickness portion forming step S1102 is a step of forming the second thickness portion 320 on the first electrode layer 100 (that is, on at least one of the first active material layer 120 and the first collector 110) by the solid electrolyte layer forming unit 500.

The second active material layer forming step S1201 is a step performed after the second thickness portion forming step S1102. The second active material layer forming step S1201 is a step of forming, by the electrode layer forming unit 600, the second active material layer 220 at a position facing (for example, in contact with) the first thickness portion 310 and not facing the first active material layer 120 via the second thickness portion 320.

The second collector forming step S1202 is a step of forming, by the electrode layer forming unit 600, the second collector 210 that extends to the position facing the second thickness portion 320 and the region provided with the second active material layer 220.

According to the above-described producing apparatus or producing method, the battery according to the first embodiment can be produced.

According to the above-described producing apparatus or producing method, the likelihood of contact between the positive electrode collector and the negative electrode collector (that is, the first collector 110 and the second collector 210) can be reduced. That is, the distance between the positive electrode collector and the negative electrode collector can be maintained at a certain distance or more (for example, the second thickness or more) by the second thickness portion 320 of the solid electrolyte layer 300. Therefore, the positive electrode collector and the negative electrode collector can avoid from getting close to each other. Consequently, for example, even in the case of an all-solid-state battery not including a separator between a positive electrode layer and a negative electrode layer, the risk of a short circuit between the positive electrode layer and the negative electrode layer due to direct contact between the positive electrode collector and the negative electrode collector can be reduced. In addition, a specific member (for example, an insulation spacer) for insulating the positive electrode layer from the negative electrode layer becomes unnecessary. Consequently, the battery production steps can be further simplified and the cost can be reduced.

According to the above-described producing apparatus or producing method, the space portion 400 described in the first embodiment can be formed. Therefore, deformation and stress can be relaxed by the space portion 400. That is, the stress caused by expansion and shrinkage of each of the layers (the first active material layer 120, the second active material layer 220, and the solid electrolyte layer 300) during use of the battery can be relaxed by the space portion 400. For example, in the case where the second active material layer 220 expands, part of the second active material layer 220 is allowed to expand into the adjoining space portion 400. For example, in the case where the battery undergoes bending deformation, the generated stress can be relaxed by the space portion 400. Also, the stress generated during production of the battery can be relaxed by the space portion 400.

According to the above-described producing apparatus or producing method, the positional stability of each of collectors can be enhanced and the likelihood of contact between the collectors can be reduced during production of the battery by forming the second active material layer 220 after the second thickness portion 320 is formed.

In the second embodiment, the second electrode layer 200 prepared in advance (ready-made) may be used.

At this time, the electrode layer forming unit 600 may form the second active material layer 220 and the second collector 210 on the solid electrolyte layer 300 by, for example, bonding the second electrode layer 200 prepared in advance to the first electrode layer 100 provided with the solid electrolyte layer 300.

In other words, the second active material layer forming step S1201 and the second collector forming step S1202 may be performed, at the same time, as a step of bonding the second electrode layer 200 prepared in advance to the first electrode layer 100 provided with the solid electrolyte layer 300, for example.

In the second embodiment, the first electrode layer 100 prepared in advance (ready-made) may be used.

Alternatively, the first electrode layer 100 may be produced by the producing apparatus or the producing method according to the second embodiment.

Figure 7:
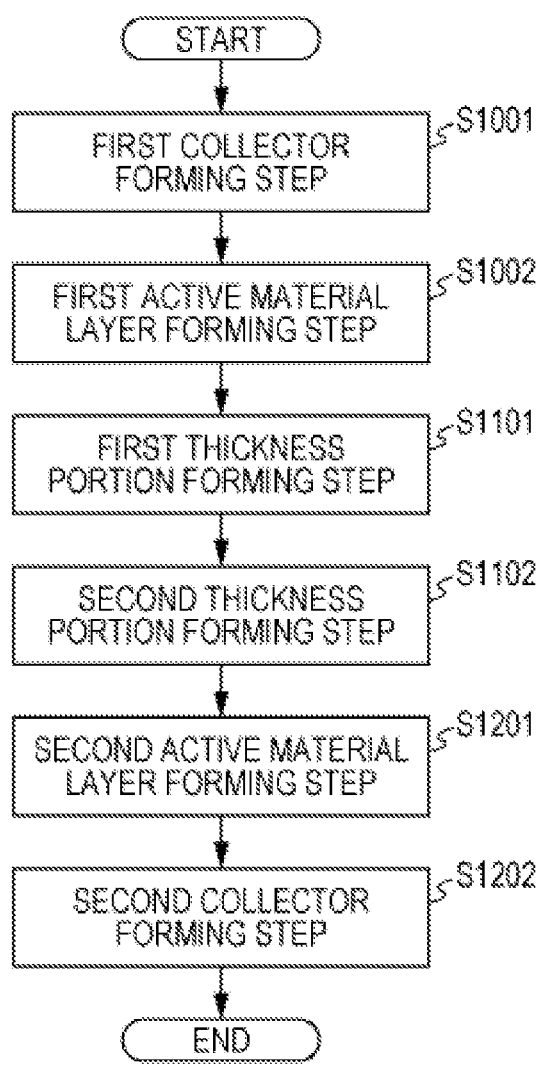
FIG. 7 is a flow chart showing a modified example of the battery manufacturing method according to the second embodiment.

FIG. 7 is a flow chart showing a modified example of the battery manufacturing method according to the second embodiment.

As shown in FIG. 7, the battery manufacturing method according to the second embodiment may further include a first collector forming step S1001 and a first active material layer forming step S1002.

The first collector forming step S1001 is a step of forming the first collector 110 by the electrode layer forming unit 600.

The first active material layer forming step S1002 is a step of forming the first active material layer 120 on the first collector 110 by the electrode layer forming unit 600.

In the electrode layer forming unit 600, the configurations of a mechanism that forms the first electrode layer 100 and a mechanism that forms the second electrode layer 200 may be partly common to or be different from each other.

A specific example of the battery manufacturing method according to the second embodiment will be described below.

Figure 8:
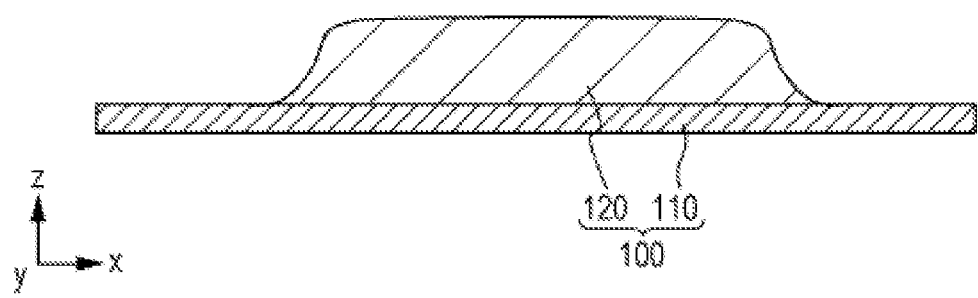
FIG. 8 is a sectional view schematically showing the configuration of a first electrode layer.

FIG. 8 is a sectional view schematically showing the configuration of the first electrode layer 100.

As shown in FIG. 8, the first active material layer 120 is formed on the first collector 110.

That is, the first electrode layer 100 is produced by coating the first collector 110 with a paste-like paint, in which the material contained in the active material explained in the first embodiment is kneaded with a solvent, and performing drying.

In order to increase the density of the first active material layer 120, the first electrode layer 100 may be pressed. The thickness of the thus produced first active material layer 120 is, for example, 5 to 300 μm.

The first active material may be a positive electrode active material. At this time, the first active material layer 120 is a positive electrode active material layer. The first collector 110 is a positive electrode collector. In this case, the first electrode layer 100 is a positive plate.

Figure 9:
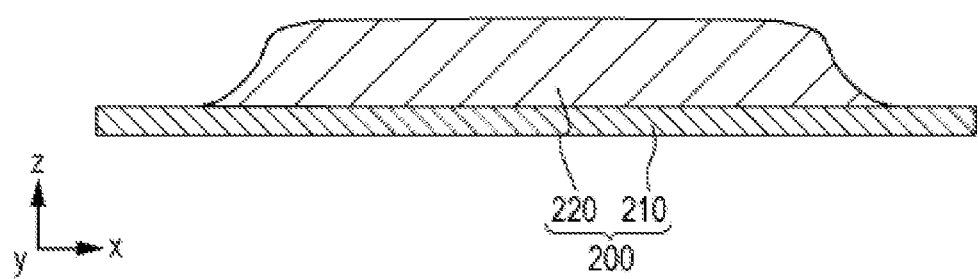
FIG. 9 is a sectional view schematically showing the configuration of a second electrode layer.

FIG. 9 is a sectional view schematically showing the configuration of the second electrode layer 200.

As shown in FIG. 9, the second active material layer 220 is formed on the second collector 210.

That is, the second electrode layer 200 is produced by coating the second collector 210 with a paste-like paint, in which the material contained in the active material explained in the first embodiment is kneaded with a solvent, and performing drying.

In order to increase the density of the second active material layer 220, the second electrode layer 200 may be pressed.

The thickness of the thus produced second active material layer 220 is, for example, 5 to 300 μm.

The second active material may be a negative electrode active material. At this time, the second active material layer 220 is a negative electrode active material layer. The second collector 210 is a negative electrode collector. In this case, the second electrode layer 200 is a negative plate.

The solid electrolyte layer 300 is formed on the first electrode layer 100.

That is, the solid electrolyte layer 300 is produced by coating the first active material layer 120 with a paste-like paint, in which the material contained in the solid electrolyte layer explained in the first embodiment is kneaded with a solvent, and performing drying.

Regarding the specific method for forming the solid electrolyte layer 300, for example, a method shown by using FIG. 11 or FIGS. 13A to 13C is employed.

As described above, the first electrode layer 100 and the second electrode layer 200 are produced and, thereafter, for example, the first electrode layer 100 and the second electrode layer 200 are bonded with (e.g., via) the solid electrolyte layer 300. More specifically, the first electrode layer 100 provided with the solid electrolyte layer 300 and the second electrode layer 200 may be stacked such that the the first active material layer 120 faces the second active material layer 220 with (e.g., via) the solid electrolyte layer 300 and press by applying pressure may be performed with a pressing machine or the like. Good bonding state of dense layers is brought about because of press by applying pressure. The function as an all-solid-state battery is favorably exerted by close adhesion and stacking of the produced layers. In this regard, even in the case where press by applying pressure is performed, the space portion described in the first embodiment can be left.

In the second embodiment, the solid electrolyte layer forming unit 500 may have a coating mechanism that applies a solid electrolyte serving as a coating agent.

In the second embodiment, the electrode layer forming unit 600 may have a mechanism that bonds the second electrode layer 200 to the first electrode layer 100 provided with the solid electrolyte layer 300. Alternatively, in the second embodiment, the electrode layer forming unit 600 may have a coating mechanism that applies the second active material serving as a coating agent.

Each of the solid electrolyte layer forming unit 500 and the electrode layer forming unit 600 may have, for example, a discharge mechanism (for example, a discharge port) that discharges the coating agent, a feed mechanism (for example, a tank and a feed pipe) that feeds the coating agent to the discharge mechanism, a transfer mechanism (for example, a roller) that transfers a coating object and the like, and a press mechanism (for example, press stage and a cylinder) that performs press by applying pressure.

The battery manufacturing apparatus 2000 according to the second embodiment may further include a controller 700, as shown in FIG. 5.

The controller 700 controls actions of the solid electrolyte layer forming unit 500 and the electrode layer forming unit 600.

The controller 700 may be composed of, for example, a processor and a memory. The processor may be, for example, a central processing unit (CPU) or a micro-processing unit (MPU). At this time, the processor may execute the control method (battery manufacturing method) disclosed in the present disclosure by reading and executing the program stored in the memory.

In the all-solid-state battery, a solid electrolyte is used instead of an electrolytic solution. Therefore, the bonding state between the solid electrolyte and the positive electrode or negative electrode is important. The all-solid-state battery can also be formed by a thin film stacking process. Alternatively, the positive electrode layer, the negative electrode layer, and the solid electrolyte layer can also be formed by a coating process having excellent productivity. At this time, examples usable as the coating method include bar coating, die coating, screen coating, ink jet coating, and other methods. There is no particular limitation regarding the order of formation of the layers in the production steps. For example, methods that involve sequential stacking, bonding, transfer, and combinations thereof can be applied.

In the battery manufacturing apparatus 2000 according to the second embodiment, the solid electrolyte layer forming unit 500 may form the second thickness portion 320 having a second thickness t2 such that a "second distance" is larger than or equal to a "first distance".

In other words, in the second thickness portion forming step S1102 of the battery manufacturing method according to the second embodiment, the second thickness portion 320 having a second thickness t2 may be formed, by the solid electrolyte layer forming unit 500, such that the "second distance" is larger than or equal to the "first distance".

The "first distance" is a distance equal to the total of the thickness of the first active material layer 120, the thickness of the second active material layer 220, and the first thickness t1 at the position at which the first thickness portion 310 is disposed.

The "second distance" is a distance from the surface of the first collector 110 to the end portion, located on the second collector 210 side, of the second thickness portion 320 at the position at which the second thickness portion 320 is disposed.

According to the above-described configuration, the second thickness portion 320 can be brought into contact with the second collector 210. Consequently, the position of the second collector 210 can be more firmly fixed by the second thickness portion 320. Therefore, the first collector and the second collector can further avoid from getting close to each other. In addition, the structural stability of the battery can be further enhanced.

In the battery manufacturing apparatus 2000 according to the second embodiment, the solid electrolyte layer forming unit 500 may form the second thickness portion 320 between the first thickness portion 310 and the first end of the first collector 110 and between the first thickness portion 310 and the second end of the first collector 110.

In other words, in the second thickness portion forming step S1102 of the battery manufacturing method according to the second embodiment, the second thickness portion 320 may be formed, by the solid electrolyte layer forming unit 500, between the first thickness portion 310 and the first end of the first collector 110 and between the first thickness portion 310 and the second end of the first collector 110.

According to the above-described configuration, the likelihood of contact between the second collector 210 and both of the first end of the first collector 110 and the second end of the first collector 110 can be further reduced.

In the battery manufacturing apparatus 2000 according to the second embodiment, the solid electrolyte layer forming unit 500 may form the second thickness portion 320 between the first thickness portion 310 and the four ends of the first collector 110.

In other words, in the second thickness portion forming step S1102 of the battery manufacturing method according to the second embodiment, the second thickness portion 320 may be formed, by the solid electrolyte layer forming unit 500, between the first thickness portion 310 and the four ends of the first collector 110.

According to the above-described configuration, the likelihood of contact between the four ends of the first collector 110 and the second collector 210 can be further reduced. In addition, the space portion 400 can be disposed so as to surround (e.g., with surrounding) the second active material layer 220. The space portion 400 can further relax deformation and stress. That is, for example, in the case where the second active material layer 220 expands, the second active material layer 220 is allowed to expand into the space portion 400 surrounding the second active material layer 220.

Figure 10:
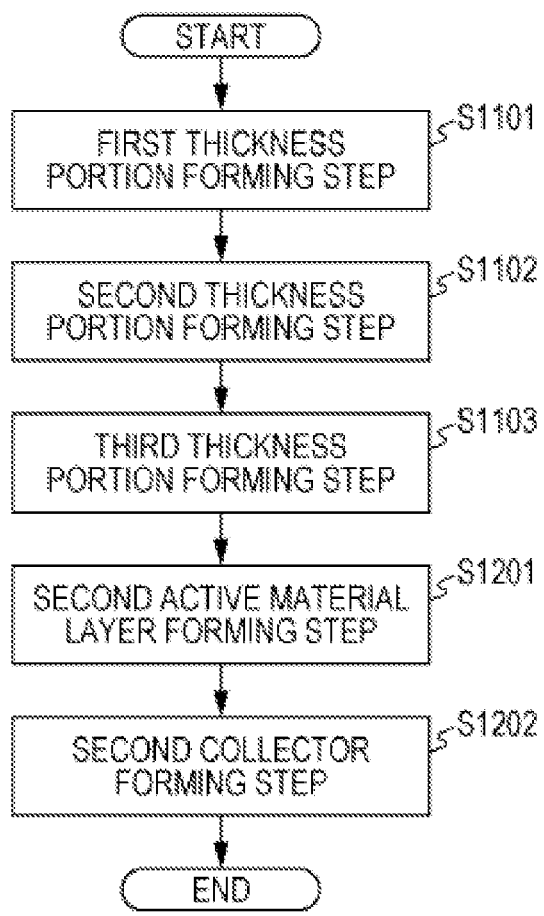
FIG. 10 is a flow chart showing a modified example of the battery manufacturing method according to the second embodiment.

FIG. 10 is a flow chart showing a modified example of the battery manufacturing method according to the second embodiment.

In the second embodiment, the solid electrolyte layer 300 may include a third thickness portion 330 having a third thickness t3. At this time, the third thickness t3 is larger than the first thickness t1 and smaller than the second thickness t2.

At this time, in the battery manufacturing apparatus 2000 according to the second embodiment, the solid electrolyte layer forming unit 500 may form the third thickness portion 330 at a position facing the second active material layer 220 or on the first active material layer 120.

In other words, in the battery manufacturing method according to the second embodiment, the second thickness portion forming step S1102 may further include a third thickness portion forming step 1103 (=forming step (a3)) of forming a third thickness portion 330, by the solid electrolyte layer forming unit 500, at a position facing the second active material layer 220 or on the first active material layer 120.

According to the above-described configuration, the distance between the first collector 110 and the second collector 210 can be more firmly fixed by the second thickness portion 320 and the third thickness portion 330. Consequently, the likelihood of contact between the first collector 110 and the second collector 210 can be further reduced.

In the battery manufacturing apparatus 2000 according to the second embodiment, the solid electrolyte layer forming unit 500 may form the first thickness portion 310 and the second thickness portion 320 at the same time.

In other words, in the battery manufacturing method according to the second embodiment, the first thickness portion forming step S1101 and the second thickness portion forming step S1102 may be performed at the same time.

According to the above-described configuration, the time required for forming the second thickness portion 320 can be reduced.

In the battery manufacturing apparatus 2000 according to the second embodiment, the solid electrolyte layer forming unit 500 may form the first thickness portion 310, the second thickness portion 320, and the third thickness portion 330 at the same time.

In other words, in the battery manufacturing method according to the second embodiment, the first thickness portion forming step S1101, the second thickness portion forming step S1102, and the third thickness portion forming step S1103 may be performed at the same time.

According to the above-described configuration, the time required for forming the second thickness portion 320 and the third thickness portion 330 can be reduced.

Figure 11:
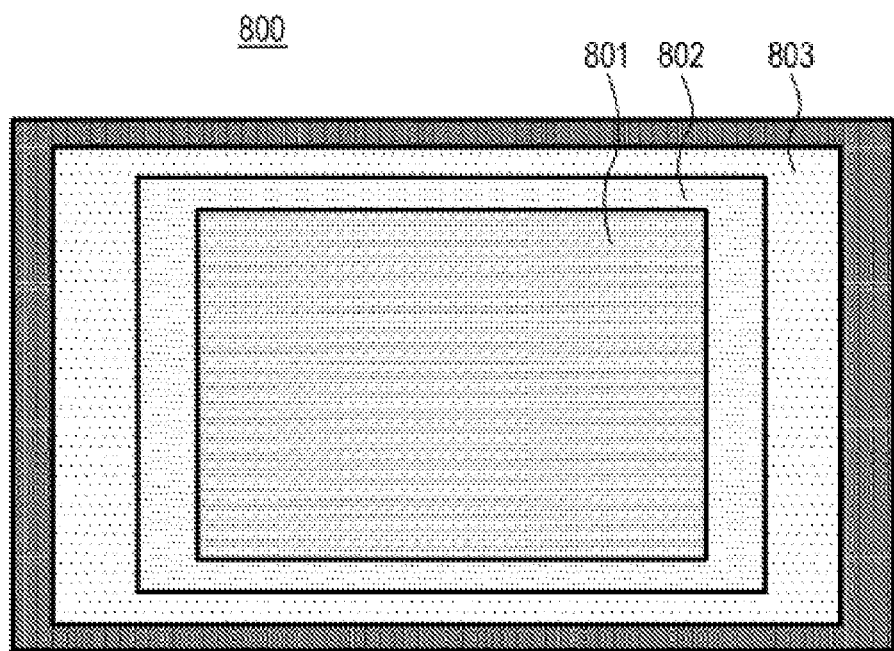
FIG. 11 is a diagram schematically showing the configuration of a screen mask according to the second embodiment.

FIG. 11 is a diagram schematically showing the configuration of a screen mask 800 according to the second embodiment.

The screen mask 800 according to the second embodiment has meshes with three levels of aperture ratios.

The solid electrolyte layer 300 is formed so as to have three levels of thicknesses by performing screen coating with the screen mask 800.

In the screen mask 800, for example, a mesh with a small aperture ratio is arranged, in a first opening portion 801, at the position in accordance with a first region centering the region in which the positive electrode active material layer and the negative electrode active material layer face each other.

In the screen mask 800, for example, a mesh with a medium level of aperture ratio is arranged, in a second opening portion 802, at the position in accordance with a second region centering the region in which the negative electrode active material layer is present and the positive electrode active material layer is not present.

In the screen mask 800, for example, a mesh with a large aperture ratio is arranged, in a third opening portion 803, at the position in accordance with a third region centering the region in which neither the positive electrode active material layer nor the negative electrode active material layer is present.

Figure 12:
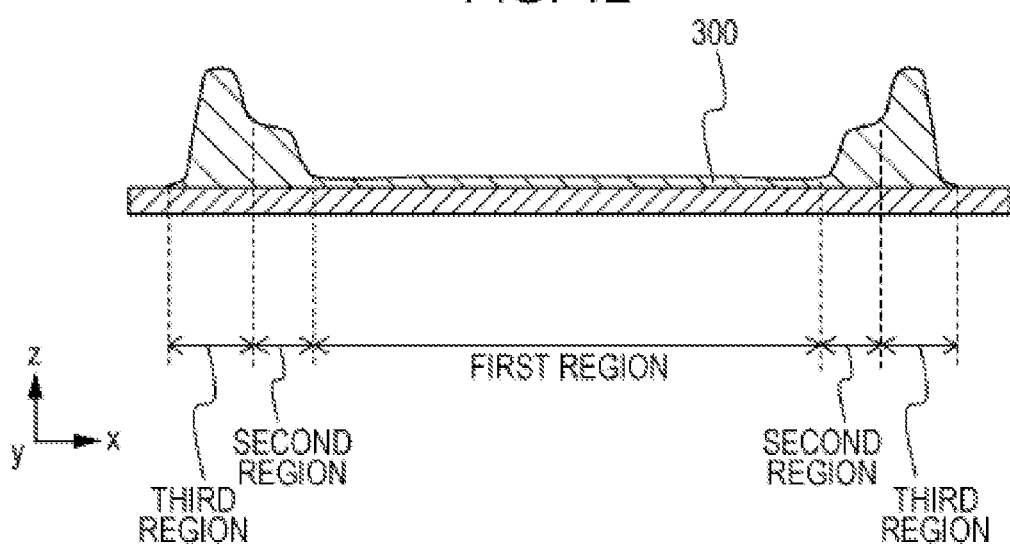
FIG. 12 is a sectional view showing an example of the film thickness distribution of a solid electrolyte layer.

FIG. 12 is a sectional view showing an example of the film thickness distribution of the solid electrolyte layer 300.

FIG. 12 shows the configuration in the case where only the solid electrolyte layer 300 is formed by using the screen mask 800.

The meshes of the screen mask 800 are used and, thereby, a thin solid electrolyte layer can be formed in the first region, a solid electrolyte layer thicker than that in the first region can be formed in the second region, and a solid electrolyte layer still thicker than that in the second region is formed in the third region.

In the battery manufacturing apparatus 2000 according to the second embodiment, the solid electrolyte layer forming unit 500 may form the first thickness portion 310 and the second thickness portion 320 at different timings.

In other words, in the battery manufacturing method according to the second embodiment, the first thickness portion forming step S1101 and the second thickness portion forming step S1102 may be performed at different timings.

According to the above-described configuration, the position of formation of the second thickness portion 320 can be determined with higher accuracy.

In the battery manufacturing apparatus 2000 according to the second embodiment, the solid electrolyte layer forming unit 500 may form the first thickness portion 310, the second thickness portion 320, and the third thickness portion 330 at different timings.

In other words, in the battery manufacturing method according to the second embodiment, the first thickness portion forming step S1101, the second thickness portion forming step S1102, and the third thickness portion forming step S1103 may be performed at different timings.

According to the above-described configuration, the positions of formation of the second thickness portion 320 and the third thickness portion 330 can be determined with higher accuracy.

Figure 13A:
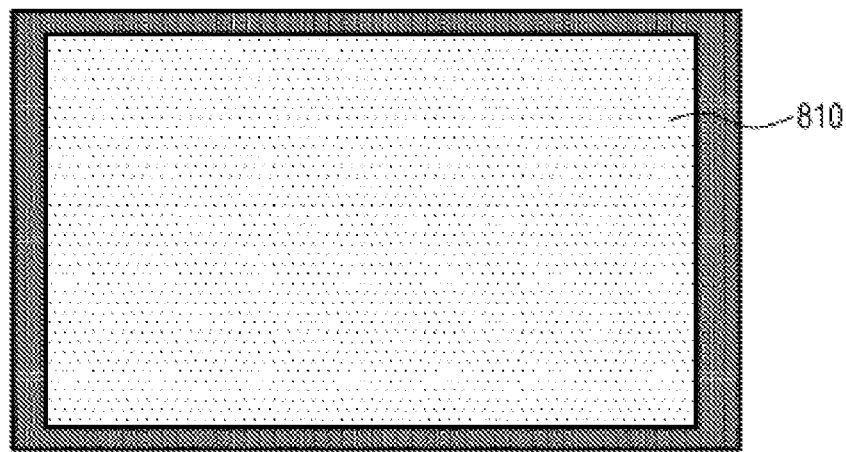
FIGS. 13A to 13C are diagrams schematically showing the configurations of screen masks according to the second embodiment.
Figure 13B:
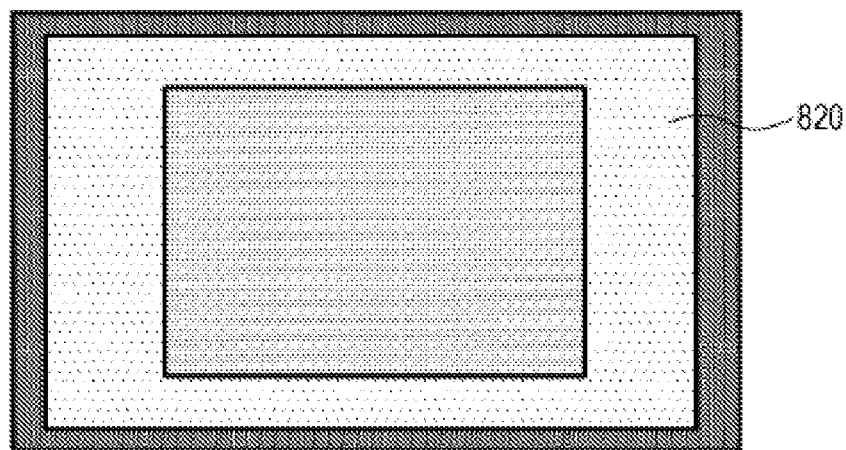
Figure 13C:
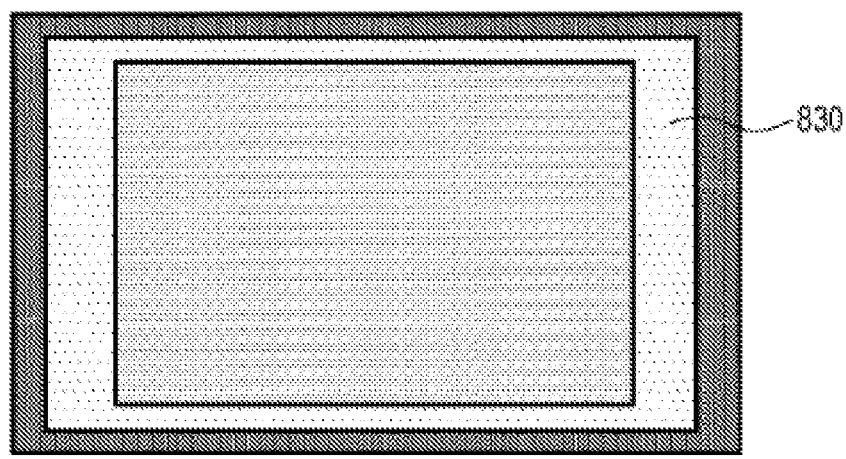

FIGS. 13A to 13C are diagrams schematically showing the configurations of screen masks 810 to 830 according to the second embodiment.

Three types of screen masks 810 to 830 according to the second embodiment have meshes with the respective aperture ratios.

The solid electrolyte layer 300 can be formed so as to have a plurality of thicknesses by performing screen coating with the screen masks 810 to 830 sequentially.

As shown in FIG. 13A, a mesh is arranged at the position corresponding to the entire region, in which the solid electrolyte layer is formed, (for example, the first region, the second region, and the third region) of a fourth opening portion included in the screen mask 810.

As shown in FIG. 13B, a mesh is arranged at the position corresponding to the region provided with the solid electrolyte layer excluding the region, in which the positive electrode active material layer faces the negative electrode active material layer, (for example, the second region and the third region) of a fifth opening portion included in the screen mask 820.

As shown in FIG. 13C, a mesh is arranged at the position corresponding to the region provided with the solid electrolyte layer excluding the region, in which any one of the positive electrode active material layer and the negative electrode active material layer is present, (for example, the third region) of a sixth opening portion included in the screen mask 830.

A plurality of times of coating is performed by using the screen masks 810 to 830. Consequently, the solid electrolyte layer 300 having three levels of thicknesses in the first to the third regions, as shown in FIG. 12, can be formed.

In this regard, the order of coating by using the fourth to sixth opening portions may be changed appropriately.

In the case where the bar coating or die coating method is employed, a solid electrolyte layer having three levels of thicknesses can be formed likewise by, for example, performing a plurality of times of coating.

For example, in ink jet coating, the number of dots per coating area of the paste may be set to be smallest in the first region centering the region, in which the positive electrode active material layer and the negative electrode active material layer face each other, to be somewhat large in the second region centering the region, in which the negative electrode active material layer is present and the positive electrode active material layer is not present, and to be largest in the third region centering the region in which neither the positive electrode active material layer nor the negative electrode active material layer is present. Consequently, a thin solid electrolyte layer can be formed in the first region, a solid electrolyte layer thicker than that in the first region can be formed in the second region, and a solid electrolyte layer still thicker than that in the second region can be formed in the third region. That is, the solid electrolyte layer can be formed so as to have a plurality of thicknesses.

Alternatively, the number of dots per coating area may be fixed, and the ink dot diameter may be set to be smallest in the first region centering the region, in which the positive electrode active material layer and the negative electrode active material layer face each other, to be somewhat large in the second region centering the region, in which the negative electrode active material layer is present and the positive electrode active material layer is not present, and to be largest in the third region centering the region in which neither the positive electrode active material layer nor the negative electrode active material layer is present. Consequently, a thin solid electrolyte layer can be formed in the first region, a solid electrolyte layer thicker than that in the first region can be formed in the second region, and a solid electrolyte layer still thicker than that in the second region can be formed in the third region.

The battery manufacturing method according to the second embodiment can be applied to not only the paste coating method but also a method that involves using a thin film process for forming the solid electrolyte layer. For example, in an evaporation method or a sputtering method, metal masks having three types of shapes may be prepared so as to limit film formation regions and films may be formed by stacking. Consequently, in the same manner as that in the case of paste coating film formation, a thin solid electrolyte layer can be formed in the first region, a solid electrolyte layer thicker than that in the first region can be formed in the second region, and a solid electrolyte layer still thicker than that in the second region can be formed in the third region.

The distance between the positive electrode collector and the negative electrode collector can be made, for example, constant over the entire film formation region by forming the solid electrolyte layer so as to have a plurality of thicknesses. For example, the thickness of the positive electrode active material layer may be set to be 100 µm, and the thickness of the negative electrode active material layer formed in the region wider than the region of the positive electrode active material layer may be set to be 130 µm. At this time, the thickness of the solid electrolyte layer may be set to be 30 µm in the first region, to be 130 µm in the second region, and to be 260 µm in the third region. In this case, the distance between the positive electrode collector and the negative electrode collector can be made 260 µm that is constant over the entire film formation region.

As described above, in the case where the distance between the positive electrode collector and the negative electrode collector is made constant over the entire film formation region, the risk of contact between the positive electrode collector and the negative electrode collector can be reduced to a great extent even when a collector not provided with a film outside the film formation region of the solid electrolyte is present.

The first region, in which the thin electrolyte layer is formed, may be somewhat wider than the region in which the positive electrode active material layer and the negative electrode active material layer face each other. The outer end portion of the second region may be somewhat wider than the region in which the negative electrode active material layer is present and the positive electrode active material layer is not present. Consequently, in the case where the coating positions of the solid electrolyte layer and the positive electrode active material layer or the negative electrode active material layer are slightly deviated from designated positions, a local increase in the coating thickness due to overlap can be avoided. That is, poor adhesion between layers and occurrences of cracking during a pressing step due to a local increase in the thickness can be prevented.

In the case where the first region is somewhat wider than the region, in which the positive electrode active material layer and the negative electrode active material layer face each other and the outer end portion of the second region is somewhat wider than the region, in which the negative electrode active material layer is present and the positive electrode active material layer is not present, the space portion described in the first embodiment is generated inside the battery.

The position, which is around the positive electrode active material layer, or around the negative electrode active material layer, of the space portion can be changed appropriately in accordance with the film formation range or the order of film formation in the stacking film formation step. For example, in the case where the positive electrode collector provided with the positive electrode active material layer and the solid electrolyte layer and the negative electrode collector provided with the negative electrode active material layer in the range wider than the range of the positive electrode active material layer are made to face each other and are bonded, the space portion shown in FIG. 1 or FIG. 3 can be formed. In the case where the negative electrode collector provided with the negative electrode active material layer and the solid electrolyte layer and the positive electrode collector provided with the positive electrode active material layer in the range narrower than the range of the negative electrode active material layer are made to face each other and are bonded, the space portion shown in FIG. 2 or FIG. 4 can be formed.

Figure 20:
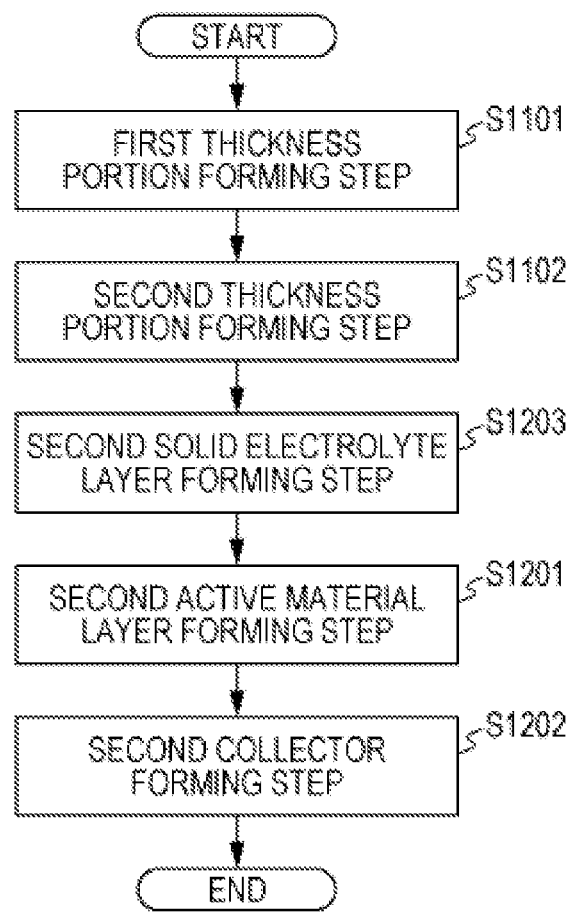
FIG. 20 is a flow chart showing a modified example of the battery manufacturing method according to the second embodiment.

FIG. 20 is a flow chart showing a modified example of the battery manufacturing method according to the second embodiment.

As shown in FIG. 20, the battery manufacturing method according to the second embodiment may further include a second solid electrolyte layer forming step S1203 (=forming step (d)).

The second solid electrolyte layer forming step S1203 is a step of forming a second solid electrolyte layer 230 between the second active material layer 220 and the first thickness portion 310 by the electrode layer forming unit 600.

In other words, in the battery manufacturing apparatus 2000 according to the second embodiment, the electrode layer forming unit 600 may form the second solid electrolyte layer 230 between the second active material layer 220 and the first thickness portion 310.

According to the above-described configuration, a battery (for example, the battery 1500 according to the first embodiment) having the second electrode layer 200 including the second solid electrolyte layer 230 can be produced.

As shown in FIG. 20, the second solid electrolyte layer forming step S1203 may be performed after the second thickness portion forming step S1102.

At this time, the second active material layer forming step S1201 may be performed after the second solid electrolyte layer forming step S1203.

The electrode layer forming unit 600 may form the second solid electrolyte layer 230, the second active material layer 220, and the second collector 210 on the solid electrolyte layer 300 by, for example, bonding the second electrode layer 200 prepared in advance to the first electrode layer 100 provided with the solid electrolyte layer 300.

In other words, the second active material layer forming step S1201, the second collector forming step S1202, and the second solid electrolyte layer forming step S1203 may be performed, at the same time, as a step of bonding the second electrode layer 200 prepared in advance to the first electrode layer 100 provided with the solid electrolyte layer 300, for example.

Regarding a modified example of the battery manufacturing method according to the second embodiment, in the forming step (a2), the second thickness portion 320 having a second thickness t2 may be formed, by the solid electrolyte layer forming unit 500, such that the "second distance" is larger than or equal to a "third distance".

In other words, in the battery manufacturing apparatus 2000 according to the second embodiment, the solid electrolyte layer forming unit 500 may form the second thickness portion 320 having a second thickness t2 such that the "second distance" is larger than or equal to the "third distance".

The "third distance" is a distance equal to the total of the thickness of the first active material layer 120, the thickness of the second active material layer 220, the first thickness t1, and the thickness of the second solid electrolyte layer at the position at which the first thickness portion 310 is disposed.

The "second distance" is a distance from the surface of the first collector 110 to the end portion, located on the second collector 210 side, of the second thickness portion 320 at the position at which the second thickness portion 320 is disposed.

The present disclosure is suitable for various device uses (for example, battery and other various energy devices, various ceramic devices, and carbon material devices) formed by, for example, stacking a plurality of functional layers having different areas.

What is claimed is:

1. A battery comprising:
a first electrode layer;
a solid electrolyte layer located on the first electrode layer;
a second electrode layer which is located on the solid electrolyte layer and which is a counter electrode layer of the first electrode layer; and
a space portion,
wherein the first electrode layer is a layer including a first collector and a first active material layer located on the first collector,
the second electrode layer is a layer including a second collector, a second solid electrolyte layer, and a second active material layer located on the second collector,
the solid electrolyte layer is a layer including a first thickness portion having a first thickness and a second thickness portion having a second thickness larger than the first thickness,
the first thickness portion is located on the first active material layer,
the second thickness portion is located on the first collector,
the second active material layer is located at a position which faces the first thickness portion and which does not face the first active material layer via the second thickness portion,
the second collector is disposed with extending to a position facing the second thickness portion and a region provided with the second active material layer,
the second thickness portion is in direct contact with the second collector,
the second solid electrolyte layer is located between the second active material layer and the first thickness portion, and
the space portion is surrounded by the second solid electrolyte layer and the second thickness portion.

2. The battery according to claim 1, wherein the second thickness portion is located between the first thickness portion and a first end of the first collector and between the first thickness portion and a second end of the first collector.

3. The battery according to claim 2, wherein the second thickness portion is located between the first thickness portion and four ends of the first collector.

4. The battery according to claim 1, wherein the second active material layer is located at a position in contact with the first thickness portion.

5. The battery according to claim 1, wherein the solid electrolyte layer includes a third thickness portion having a third thickness larger than the first thickness and smaller than the second thickness, and the third thickness portion is located at a position facing the second active material layer or on the first active material layer.

6. The battery according to claim 5, wherein the second thickness portion is different from the third thickness portion.

7. The battery according to claim 5, wherein the third thickness portion resides on one side of the second thickness portion as a whole.

8. The battery according to claim 1, wherein the space portion is formed only by the second solid electrolyte layer and the second thickness portion.

9. The battery according to claim 1, wherein the second thickness portion is in direct contact with the first collector.

10. The battery according to claim 9, wherein a contact area between the second thickness portion and the first collector is larger than a contact area between the second thickness portion and the second collector.

11. The battery according to claim 1, wherein the second solid electrolyte layer is in direct contact with the second collector.

12. The battery according to claim 1, wherein the first thickness portion is in direct contact with the second solid electrolyte layer.

13. The battery according to claim 1, wherein the second thickness portion is in direct contact with the first collector.

14. The battery according to claim 1, wherein the space portion is not in direct contact with either one of the first collector or the second collector.

15. The battery according to claim 1, wherein peripherals of the space portion are formed by the solid electrolyte layer and the second solid electrolyte layer only.

16. The battery according to claim 1, wherein a contact point between the second thickness portion and the second collector is directly above a contact point between the second thickness portion and the first collector.

* * * * *